No. 785,051. PATENTED MAR. 14, 1905.
A. C. SCHULTZ.
JOURNAL BEARING.
APPLICATION FILED MAR. 12, 1903.
2 SHEETS—SHEET 1.
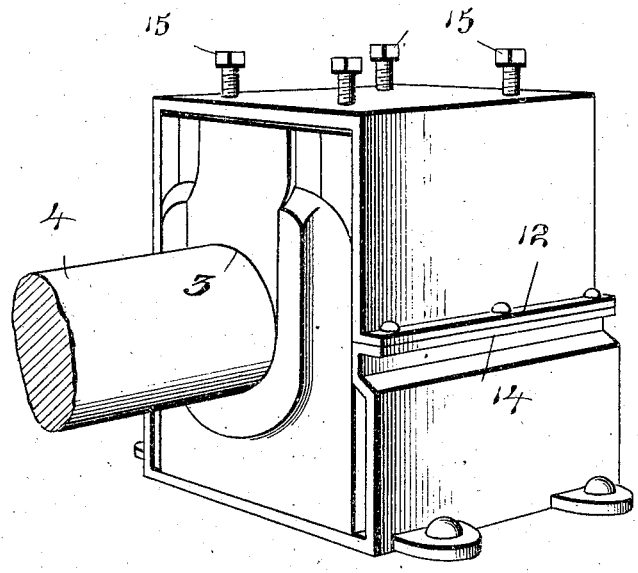
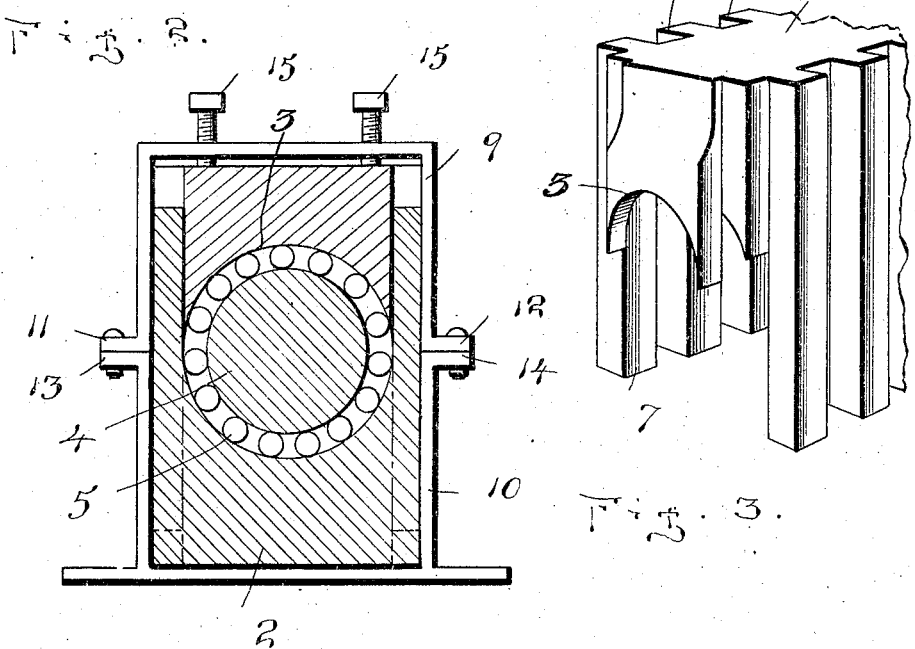
Witnesses
Inventor
Anders Carlson Schultz
By Victor J. Evans
Attorney No. 785,051. PATENTED MAR. 14, 1905.
A. C. SCHULTZ.
JOURNAL BEARING.
APPLICATION FILED MAR. 12, 1903.
2 SHEETS—SHEET 2.
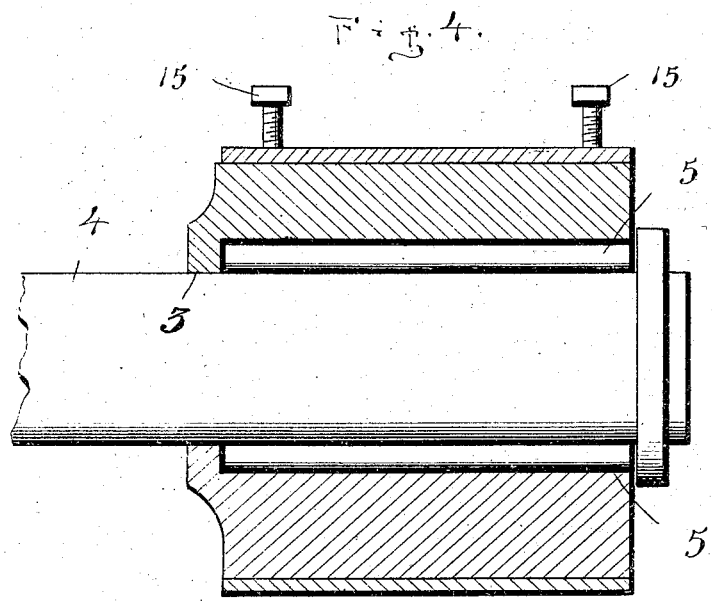
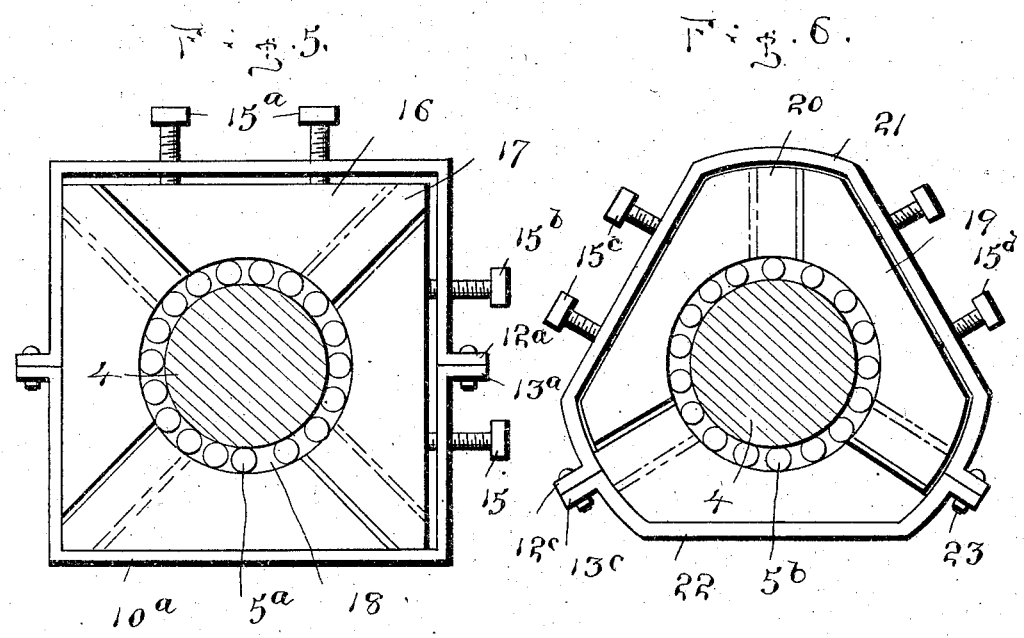
Witnesses
F. W. Riley
O. F. Punk
Inventor
Anders Carlson Schultz
By Victor J. Evans
Attorney No. 785,051. Patented March 14, 1905.

UNITED STATES PATENT OFFICE.

ANDERS CARLSON SCHULTZ, OF CAMDEN, NEW JERSEY.

JOURNAL-BEARING.

SPECIFICATION forming part of Letters Patent No. 785,051, dated March 14, 1905.

Application filed March 12, 1903. Serial No. 147,505.

*To all whom it may concern:*

Be it known that I, ANDERS CARLSON SCHULTZ, a citizen of the United States, residing at Camden, in the county of Camden and State of New Jersey, have invented new and useful Improvements in Journal-Bearings, of which the following is a specification.

This invention relates to journal-bearings; and the object thereof is to provide an adjustable bearing which will reduce the friction caused by the rotation of a shaft to a minimum.

Another object is to provide an effective form of adjustment to compensate for wear caused by the continuous rotation of a shaft, so that a firm and even bearing will at all times be provided.

Other objects, as well as the novel details of construction, will be apparent as the nature of the invention is better understood, and these will become obvious by reference to the following description, together with the accompanying drawings, in which—

Figure 1 is a perspective view of the preferred form of bearing or journal-box, showing a portion of a shaft projecting therefrom. Fig. 2 is a vertical cross-sectional view through the bearing, showing the casing or clamping device for the adjustable sections in elevation. Fig. 3 is a detail perspective view of the top of the upper half of the journal-bearing. Fig. 4 is a vertical longitudinal sectional view through the box, the axle or shaft being shown in elevation. Fig. 5 is an end view of a slightly-modified form of box, and Fig. 6 is a similar view of a still further modified form.

The box which embraces the axle or shaft is a sectional one and can include two or more sections, properly held together by a suitable band or casing. In the preferred form (shown in Figs. 1, 2, 3, and 4) I have illustrated the box as consisting of upper and lower vertical sections, designated by the reference-numerals 1 and 2 and slidable with relation to each other. Each section comprises a block approximately rectangular and provided at one side with a semicircular groove 3. The arc of this groove is somewhat greater than the arc on which the circumference of the shaft 4 is struck, so that a space will intervene between the outer surface of the shaft and the inner wall of the groove. Within the space thus formed are arranged a plurality of antifriction-rollers 5. The two grooves in the respective sections are arranged so that when the two sections are brought together, as shown in Figs. 1, 2, and 4, a circular seat will be formed for the reception of the shaft, and any wear upon the grooves can be readily taken up by adjusting devices to be referred to hereinafter. By reference to Fig. 3 it will be noticed that on the opposite edges of each block are ribs 6, having extending ends 7, parallel with each other and spaced apart at proper intervals to form grooves 8 for the reception of similar coinciding ribs on the opposite member. The grooves and ribs are of approximately the same width and depth, so that the ribs on one member will interlock with the grooves in the other. In order that this may readily be accomplished, the ribs on the member 1 are alternately arranged with relation to those on the member 2, so that the ribs on each member aline with the grooves on the opposite member. As the grooves and ribs are vertically disposed, the two members will be vertically adjustable with relation to each other and are held in engagement by means of a sectional casing or clamping device comprising the upper and lower members 9 and 10, which pass over the top and bottom and embrace the sides of the respective box-sections. Oppositely-disposed flanges 11 and 12 are provided for the top member of the clamping device, and these flanges are parallel with the flanges 13 and 14 on the bottom member. The two flanges can be secured together by means of suitable bolts or fastening devices 15, which pass therethrough for this purpose. It will be observed that the horizontal plate at the top of the clamping device is spaced apart from the top edge of the upper member 1 of the sectional box. This is to permit a vertical play of the upper member of the sectional box to provide for wear and permit an easy adjustment to compensate therefor. The adjustment can be accomplished and the wear taken up by the adjusting-screws 15, projecting through the top plate and bearing upon the member 1 of the sectional box. Thus by turning the adjusting-screws 15 to slide the upper member upon the opposite one a firm even bearing will be provided for the shaft or axle 4. The peculiar manner of arranging the upper and lower interlocking members will permit of a perfect pressure being exerted upon the rollers 5, and while this form is particularly designed as a general box for car-axle it is obvious that it will be equally applicable for line-shafts and similar journals.

In Fig. 5 a slightly-modified form of bearing is provided, which consists of a plurality of quadrantal sections, each section being approximately pyramidal in form. These sections are each designated by the reference-numeral 16, and the diverging edges are provided or formed with longitudinally-disposed interlocking ribs 17, similar to the ribs 6 on the sections shown in Figs. 1 to 4, the ribs on one section alternating with those on the other, so that when the four quadrants are in interlocked position an approximately rectangular bearing will be provided with a concentric opening through which the shaft projects. Suitable antifrictional rollers $5^a$ are arranged in the central opening 18, formed by the inner ends of the several sections, and these rollers are arranged in circular series around the shaft. In order that the several sections will be held in proper interlocked relation, I provide a casing similar to the one illustrated in the form shown in Figs. 1 to 4 and which comprises an upper and lower approximately U-shaped member the meeting ends of which are formed with outwardly-projecting parallel flanges $12^a$ and $13^a$. In this form the wear on the bearing is taken up by the adjusting-screws $15^a$ in the top of the casing and the transverse horizontally-projecting bolts or screws $15^b$, extending through the sides of the casing and bearing against one of the side quadrants. In view of the fact that the meeting edges of the several quadrants are diagonally disposed the pressure exerted by the screws $15^a$ and those designated by the reference-numeral $15^b$ will cause the sections to become rigidly interlocked.

In the form shown in Fig. 6 the shaft is surrounded by a plurality of sectors or members 19, forming a central opening for the reception of the shaft and designed to receive the antifriction-rollers $5^b$, which are interposed between the shaft and the edge of the central opening. The edges of the several sections 19 diverge toward the outer ends, so that the meeting edges of the sections when brought together are radially disposed, and the edge of each member is provided with interlocking ribs 20 for engagement with corresponding grooves in the adjacent section. The bearing thus provided by the several sections is approximately triangular in form, and the sectors are held together by a casing comprising upper and lower sections 21 and 22, the meeting ends of which are formed with parallel flanges $12^c$ and $13^c$. Suitable fastening devices, such as bolts or rivets 23, will be used to secure the flanges to each other, and thereby hold the casing in proper position to lock the sectors together. $15^c$ and $15^d$ designate two sets of clamping-screws, which are carried by the upper section and are designed to be turned so as to force the sectors in rigid interlocked relation.

It will be observed that the same general plan is followed in all of the forms and that the variations consist, chiefly, in the shape or contour of the various sections. Other modifications or variations in the form may be made without materially departing from the spirit of this invention, and I therefore reserve the right to make such slight changes as may suggest themselves and without departing from the spirit of this invention.

Having thus described the invention, what is claimed as new is—

1. A journal-bearing comprising sections adapted to interlock with each other, for the full extent of corresponding sides thereof, and a casing inclosing the sections, said sections being constructed on their inner faces to form an opening for the reception of a journal.

2. A journal-bearing comprising sections having alternating ribs and grooves for the full extent of corresponding sides thereof, the ribs on one section being disposed opposite and movable in the grooves of the other section, a casing inclosing the sections, and adjusting devices for one of the sections working through a part of said casing.

In testimony whereof I affix my signature in presence of two witnesses.

ANDERS CARLSON SCHULTZ.

Witnesses:
  Hars Johnson,
  Herman Hansen.